United States Patent [19]

Iwashita et al.

[11] 4,182,562
[45] Jan. 8, 1980

[54] AUTOMATIC WINDING UP DEVICE FOR A CAMERA

[75] Inventors: Tomonori Iwashita, Fuchu; Masanori Uchidoi, Yokohama; Toshikazu Ichiyanagi, Tokyo; Tetsuya Taguchi, Kawasaki; Yukio Iura, Yokosuka; Hiroshi Aizawa, Machida, all of Japan

[73] Assignee: Canon Kabushiki Kaisha, Tokyo, Japan

[21] Appl. No.: 868,862

[22] Filed: Jan. 12, 1978

Related U.S. Application Data

[63] Continuation of Ser. No. 741,727, Nov. 15, 1976, abandoned.

[30] Foreign Application Priority Data

Nov. 17, 1975 [JP] Japan ............................. 50-137987
Nov. 17, 1975 [JP] Japan ............................. 50-137988

[51] Int. Cl.² .......................... G03B 1/12; G03B 9/64
[52] U.S. Cl. .................................. 354/173; 354/238
[58] Field of Search ............... 354/171, 173, 213, 238; 352/169, 175, 176, 177

[56] References Cited

U.S. PATENT DOCUMENTS

| | | | |
|---|---|---|---|
| 3,688,669 | 9/1972 | Ogiso et al. | 354/171 |
| 3,946,409 | 3/1976 | Toyoda | 354/173 |
| 3,994,003 | 11/1976 | Iwashita et al. | 354/173 |

*Primary Examiner*—Michael L. Gellner
*Attorney, Agent, or Firm*—Toren, McGeady and Stanger

[57] ABSTRACT

An automatic winding up device for a camera, in which a device for detecting the winding up completion signal supplied from the camera body as well as a delay device starting to operate by the detection of the winding up completion signal by the detecting device are disclosed. These devices operate in such a manner that the current supply to the winding up motor is maintained during the operation of the delay device. This acts to overload the motor for a certain time determined by the delay device after the completion of the winding up operation and overloads the winding up mechanism of the camera body. The current supply to the motor is interrupted after lapse of a time determined by the delay device so as to stop the motor. The winding up member is driven in the reversed direction by the reaction of the overload exercised on the winding up mechanism so that the load exercised on the camera is released at the termination of the winding up operation.

14 Claims, 11 Drawing Figures

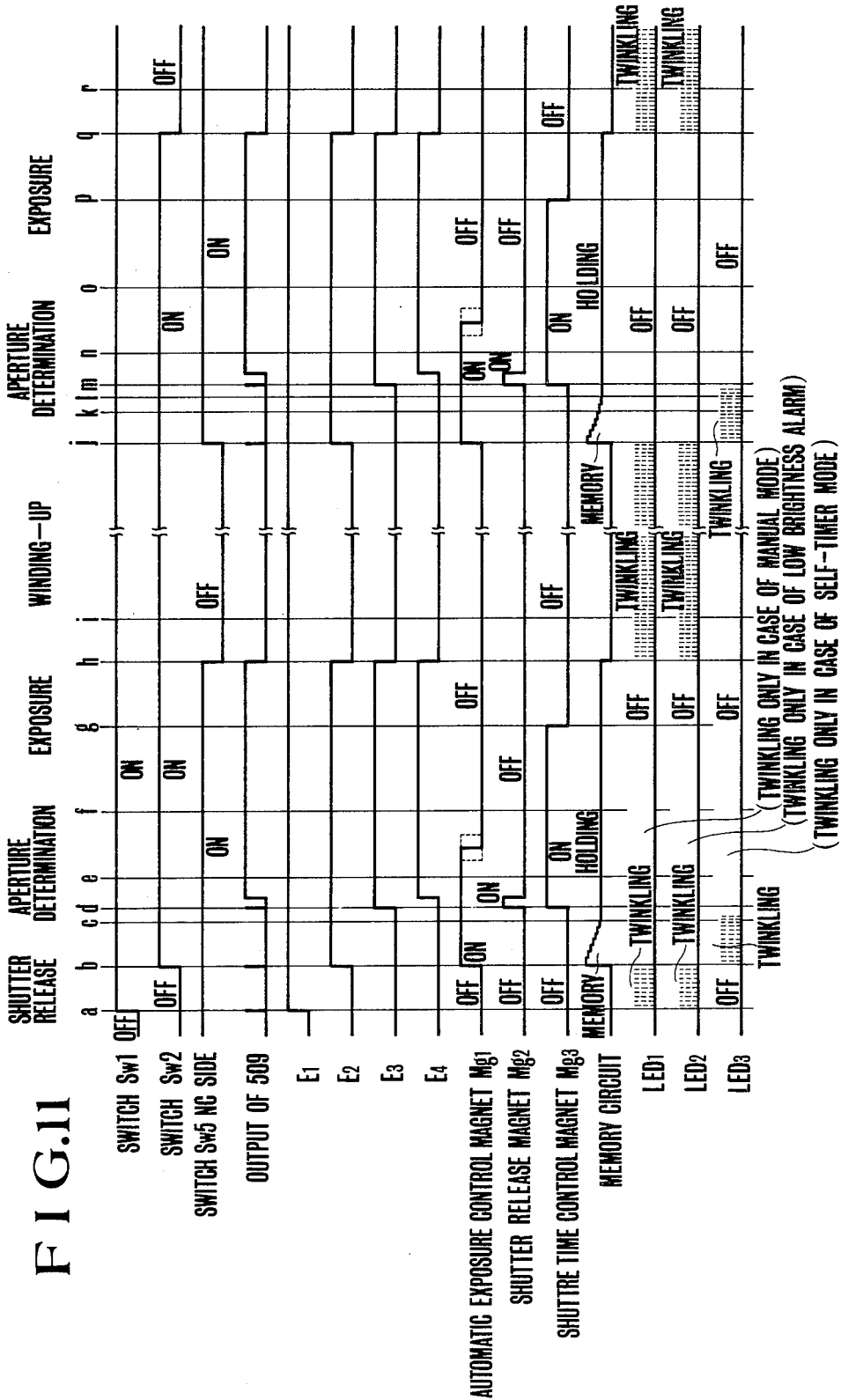

AUTOMATIC WINDING UP DEVICE FOR A CAMERA

This is a continuation of application Ser. No. 741,727, filed Nov. 15, 1976 now abandoned.

BACKGROUND OF THE INVENTION

1. Field of the Invention

The present invention relates to an improvement of the automatic winding up device of a camera, particularly to the automatic winding up device of a camera suited for the continuous photography.

2. Description of the Prior Art

Generally the winding up device of a camera is so designed that the winding up lever and the winding up stop cam operate as one body with each other in only the winding up direction by means of an one way clutch. Thus, when the winding up lever operates, the winding up stop cam is rotated through the one way clutch so as to rotate the winding up shaft and to complete the winding up operation. Thus, when the shutter is charged, the winding up stop lever becomes engageable into the groove of the winding up stop cam in such a manner that, when the shutter has been charged, the winding up stop lever engages into the groove of the winding up stop cam. When the rear shutter plane has run, releasing the shutter, the winding up stop lever gets out of the groove in the winding up cam in functional engagement with the rear shutter plane brake so that the next winding up operation becomes possible.

However, when the shutter is released while the winding up lever is maintained in a state and pressed with a force larger than a certain predetermined value in the winding up direction, the next winding up operation by means of the winding up lever often is impossible. This occurs because the winding up stop lever can not be taken out of the groove in the winding up stop cam when the force required to take the winding up stop lever out of the groove in the winding up stop cam (which is in functional engagement with the rear shutter plane brake) is smaller than that with which the winding up stop lever is pressed on the wall surface of the groove in the winding up stop cam.

However, in the case of normal photography, the photographer unconsciously allows the winding up lever to assume the initial position after the operation of the winding up lever so that the problems that the next winding up operation can not be carried out rarely occur.

However, when the winding up of the camera is automatically carried out by means of a motor driving device and so on, a large load is exercised on the above mentioned winding up stop lever and the groove in the winding up stop cam due to the mechanical winding up after the completion of the winding up operation. In this situation, it often happens that the next winding up operation is impossible.

In consequence, when, in an automatic winding up device such as a motor driving device, a sliding clutch is provided in the winding up transmission mechanism in such a manner that the eventual overload after the completion of the winding up operation is absorbed by this clutch or when an overload is exercised upon the motor, the increase of the driving current of the motor is electrically detected so as to stop the current supply to the motor and avoid the overload. However, in the former system it is necessary to provide the sliding clutch in the transmission mechanism and therefore the winding up mechanism becomes complicated. Accordingly, the mechanism can not be made compact. Also, depending upon the magnitude of the overload when the sliding begins, when an electrical load is given to the motor, the adjustment is difficult. Further in the case of the latter system, it is necessary to detect the overcurrent level of the motor and therefore it is necessary to provide the level detecting circuit whereby the adjustment of the set level is not an easy task in the same way as in the case of the former system. Also, when there takes place any load having nothing to do with the winding up operation, such load is also detected in such a manner that the winding up operation is interrupted.

A purpose of the present invention therefore is to eliminate the above mentioned shortcomings, by keeping the winding up motor in the conductive state for a certain time after the completion of the winding up operation so as to overdrive the motor and to produce a reaction in the winding up mechanism of the camera so that the continuous photography can be carried out.

Another purpose of the present invention is to provide the winding up motor with a short circuit for braking with the one way conductive efficiency so as to exercise the braking effect of the motor while the backward running of the motor is made easy due to the reaction of the winding up mechanism.

A further purpose of the present invention is to make the photographic interval shorter by making the release operation possible before the completion of the operation of the winding up motor at the time of continuous photography.

A still further purpose of the present invention is to make the self-timer serve at the same time as the timer for forming the interval time from the completion of the winding up operation till the start of the release operation.

Other purposes of the present invention will be disclosed from the explanations to be made below in detail in accordance with the embodiment of the present invention.

BRIEF DESCRIPTION OF THE DRAWINGS

FIG. 11 shows a diagram for explaining the operation of the circuits shown in FIG. 6.

DESCRIPTION OF THE PREFERRED EMBODIMENT

Figure 1:
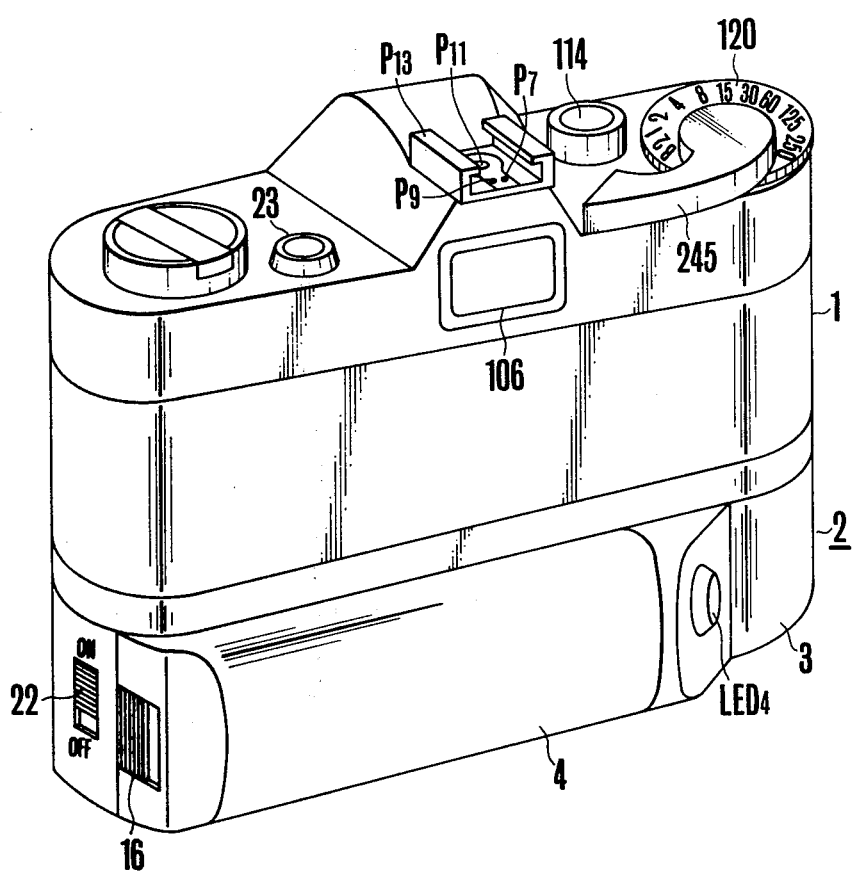
FIG. 1 shows the automatic winding up device for a camera in accordance with the present invention and a camera equipped with the device as a whole.
Figure 2:
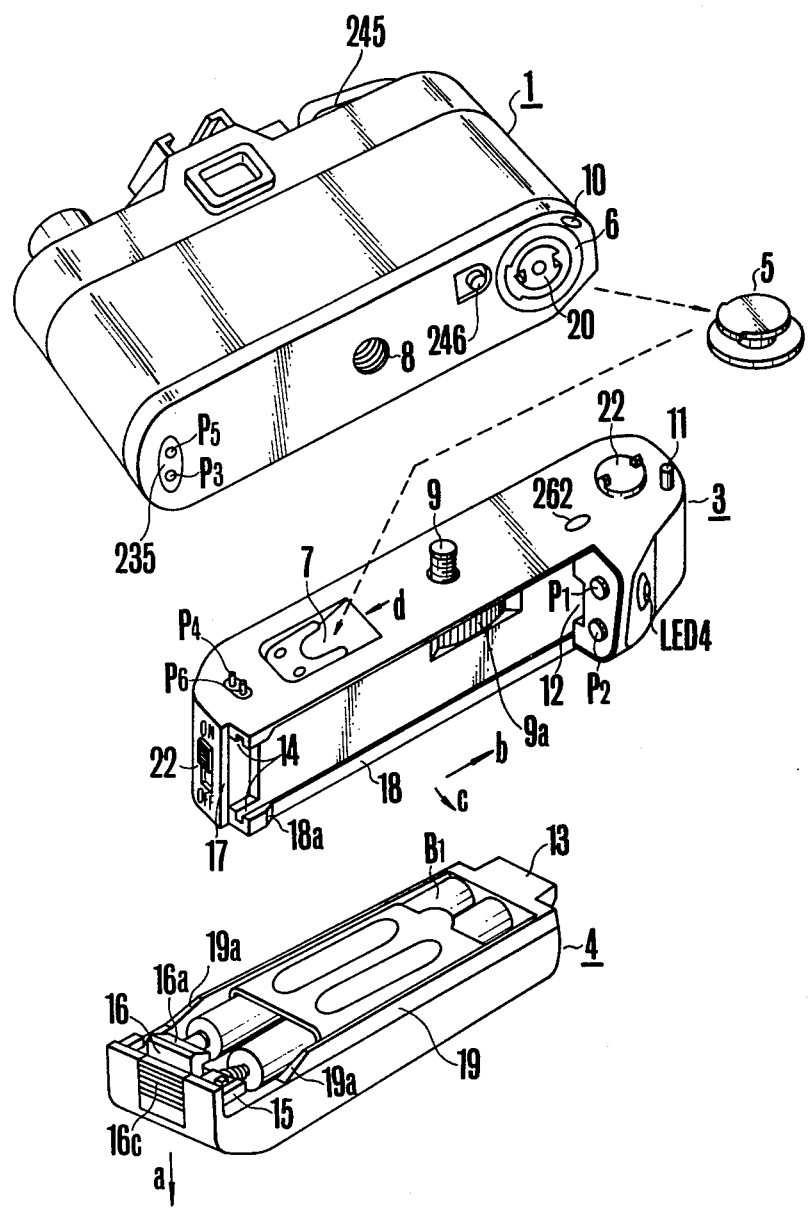
FIG. 2 shows the device and the camera shown in FIG. 1 in separated state in perspective view.

Below, the present invention will be explained in detail in accordance with the accompanying drawings of an embodiment. FIGS. 1 and 2 show the camera body and the motor driving device, wherein 1 is the camera body while 2 is the motor driving device consisting of a motor driving device body 3 and a battery case 4. 5 is a protection cover for covering the hole on the bottom of the camera when the motor driving device is not used. 7 is the space for the protection cover when the motor driving device is used. 8 is a screw hole for the tripod of the camera while 9 is the mounting screw of the motor driving device, whereby by manually rotating the nob part 9a the motor driving device is mounted on the camera. 10 is the hole for positioning the camera while 11 is the hole for positioning the motor driving device. 12 is the engagement hole for the motor driving device body, to be engaged with the projection 13 of the battery case. 14 is the concave groove to be engaged with the guide rail 15 of the battery case. 16 is the operation nob, slidable along the direction of the arrow a, and being urged by means of a spring (not shown) in the direction opposite to the arrow a and engageable with the end 17 of the motor driving device body. 18 is the guide plane of the motor driving device body while 19 is the guide plane of the battery case. P1 and P2 are the power source terminals for connecting the power source battery B1 of the motor driving device to the motor driving device body. 22 is the main switch of the motor driving device, to be explained later, 23 the battery checker button, 106 the eye piece lens, 114 the shutter release button, 120 the shutter time setting dial, 245 the film winding up lever, P7, P9, P11 and P13 the signal terminals for the accessary shoe and LED4 the illuminating diode for the auto stop display.

In order to mount the motor driving device 2 on the camera body 1, the protection cover 5 at the bottom of the camera is taken out and put into the space 7.

Figure 4:
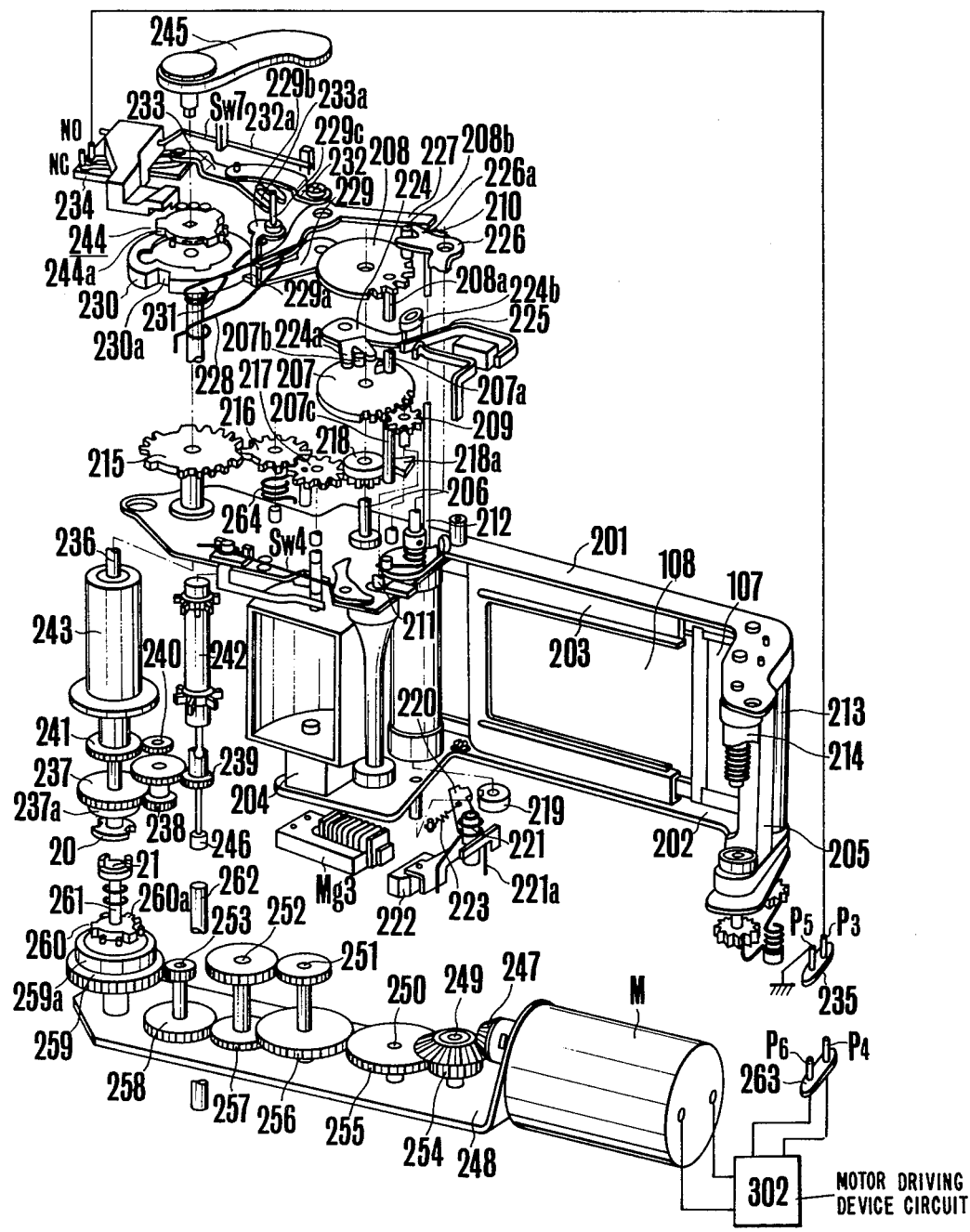
FIG. 4 shows important components constituting the system shown in FIG. 1.

Then the positioning pin 11 is inserted into the positioning hole 10 while the mounting screw 9 is screwed into the screw hole 8 of the tripod in such a manner that the motor driving device is mounted on the camera as is shown in FIG. 4. At this time, the winding coupler 20 of the camera has been mechanically engaged with the winding up coupler 21 of the motor driving device while the signal terminals P2 and P3 (to be explained later) at the side of the camera are respectively and electrically engaged with the signal terminals P4 and P6 at the side of the motor driving device. Then, in order to mount the battery case 4 on the motor driving device body 3, the battery case is slidingly moved in the direction of the arrow b while the guide plane 19 of the battery case is laid on the guide plane 18 of the motor driving device body. As the battery case 4 is slidingly moved along the direction of the arrow b, the projection 13 of the battery case enters into the engagement hole of the motor driving device body and then the guide rail 15 of the battery case is engaged into the concave groove 14 of the motor driving device body. When the battery case 4 is further moved in the direction of the arrow b after the projection 13 and the guide rail 15 are respectively engaged into the engagement hole 12 and the concave groove 14, the inclined part 16a of the operation nob 16 climbs over the end 17 of the motor driving device body so that the operation nob 16 is moved sliding against the strength of the spring (not shown) in the direction of the arrow a until, at last, the operation nob 16 is engaged with the end 17 of the motor driving device body in such a manner that the battery case 4 is finally mounted on the motor driving device body 3.

Figure 3:
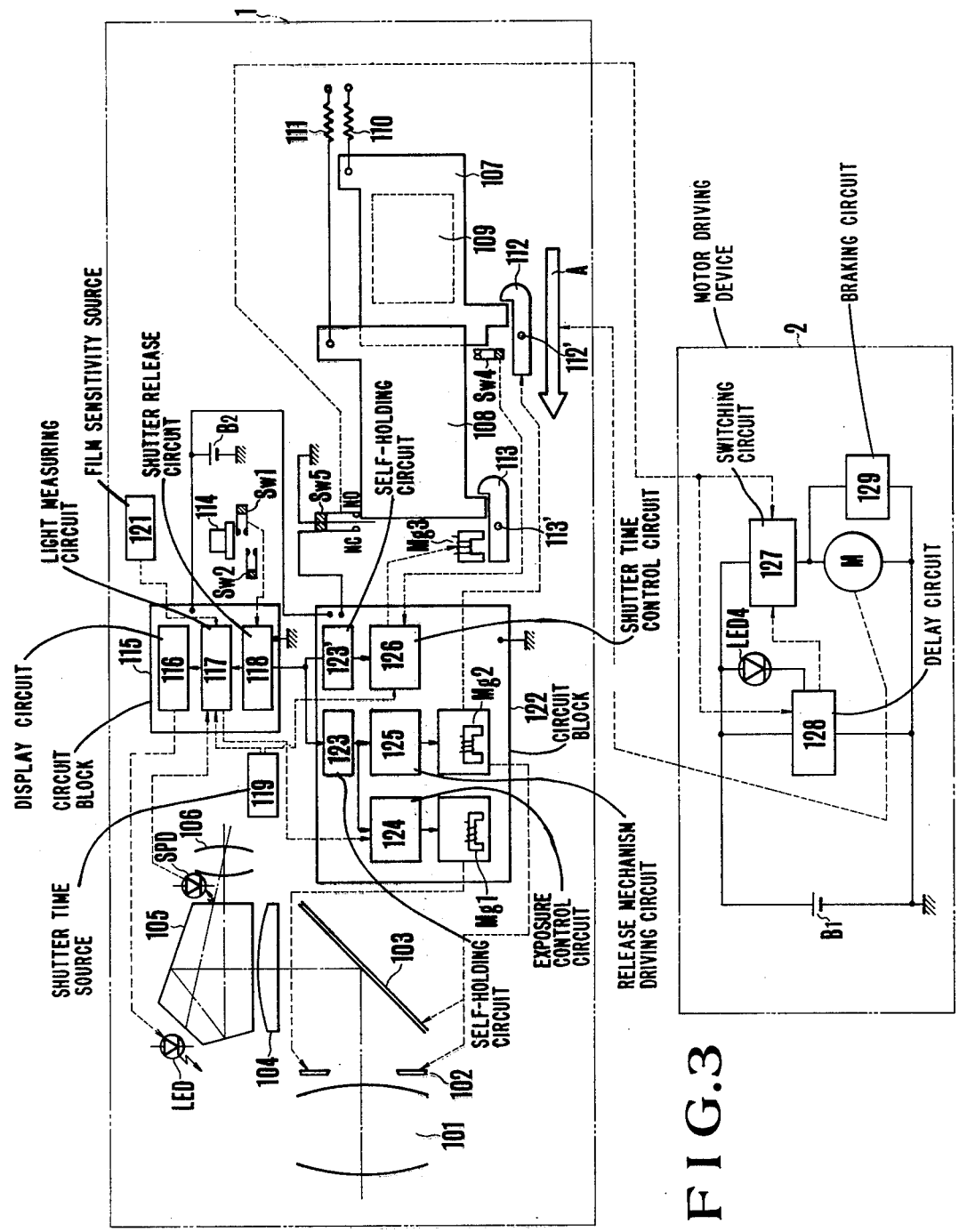
FIG. 3 shows a block diagram applicable to the system shown in FIG. 1.

FIG. 3 shows the circuits and the important components of the camera body 1 as well as the motor driving device 2 shown in FIGS. 1 and 2, whereby the parts having the same designations as in FIGS. 1 and 2 are the same components. 1 is the camera body, while 2 is the motor driving device. 101-106 are the optional system of a single reflex camera, 101 the photographic lens, 102 the diaphragm, 103 the mirror, 104 the condenser lens, 105 the pentagonal prism and 106 the eye piece lens. SPD is the light sensing element provided at the eye piece, while LED the display means such as an illuminating diode for the view finder display for displaying the photographic mode or the low brightness alarm and so on.

107-113 are the important components of the focal plane shutter of the single reflex camera, whereby 107 is the front shutter plane, 108 the rear shutter plane, 109 the aperture part, 110 the front shutter plane driving spring, 111 the rear shutter plane driving spring, 112 the front shutter plane holding lever and 113 the rear shutter plane holding lever.

SW4 is the shutter time counting switch for the electronic shutter functionally engaged with the running of the front shutter plane. SW5 the switch to be changed over to the NC side of first detected means at the completion of the film winding up and to the NC side or second detecting means by means of the rear shutter braking operation and Mg3 the shutter time control magnet. 114 is the shutter release button or operating means of the camera body, SW1 the light measuring and display switch to be closed with the first stroke of the shutter release button and switch means SW2, the exposure control and shutter releasing switch (also the signal generating means) to be closed with the second stroke of the shutter release button. 115 is a circuit including the display circuit 116, the light measuring circuit 117 and the shutter release circuit 118, being connected to the power source B2 of the camera body. 119 is the shutter time information source to be manually set by means of the shutter time setting dial 120 (FIG. 1), and 121 the film sensitivity information source, whereby the informations from these information sources are all put in the light measuring circuit 117. 122 is a circuit including the self-holding circuits 123, 123', the exposure control circuit 124, the release mechanism driving circuit 125 and the shutter time control circuit 126, to be connected to the power source B2 in the camera body and also to the NC side of the switch SW5. Consequently, the light measuring circuit 117 as well as the display circuit 116 can be closed by operating the shutter release button 114 no matter in which mode the camera is, while the exposure control circuit 124, the shutter release mechanism driving circuit 125 and the shutter time control circuit 126 can only be closed when the switch SW5 is changed over to the NC side, namely from the completion of the film winding up till the running of the rear shutter plane. Mg1 is the automatic exposure control magnet for presetting the diaphragm 102 at the aperture value determined by means of the exposure control circuit 124. Mg2 is the shutter release magnet or actuating means for controlling the driving of the diaphragm 102, the lifting up of the mirror 103 and the driving of the front shutter plane 107.

127-129 are the circuits in the motor driving device 2, whereby 127 is the switching circuit, 128 the delay circuit and 129 the braking circuit which function as the brake means.

B1 is the power source for the motor driving device while M is the winding up motor or driving means for shutter charging and film winding up, to be controlled by means of the switching circuit 127. LED4 is the illuminating diode for the auto stop display, flickering when the motor is stopped by means of the delay circuit 128. Below, the operation of the circuits as well as the important components of the camera and of the motor driving device shown in FIG. 3 will be explained in detail. (Hereby the camera body 1 and the motor driving device 2 are in the state in which the winding up operation has been completed.) At first, the switch SW1 is closed by means of the first stroke of the shutter release button 114 at the side of the camera body, the circuit 115 is closed in such a manner that all the circuit components of the circuit 115 start to operate. Namely, the light measuring circuit 117 carries out the light measurement in accordance with the outputs of the light sensing element SPD, the shutter time information source 119 and the film sensitivity information source 121 so as to deliver the then output of the aperture value, the shutter time and so on to the display circuit 116. The display circuit 116 serves to display the aperture value, the shutter time, the low object brightness alarm and so on in the view finder in accordance with the output of the light measuring circuit 117. Then the switch SW2 is closed by means of the second stroke of the shutter release button 114 of the camera body the circuit 122 is closed. (At this time the winding up operation has been completed at the side of the camera so that the shutter has been charged and therefore the switch SW5 has been changed over to the NC side.) In the circuit 122, at first the self-holding circuits 123 and 123' start to operate so as to keep the circuit 122 in the closed state until the exposure is terminated even if the switch SW2 is opened by releasing the pressure upon the shutter release button 114. Further at the same time the exposure control circuit 124 starts to operate so as to memorize the proper aperture value determined by means of the light measuring circuit 117. At the same time with the above action, the release mechanism driving circuit 125 starts to operate in such a manner that by means of exciting the shutter release magnet Mg2 the diaphragm 102 is preset at the above mentioned memorized aperture value by means of the automatic exposure control magnet Mg1 while the diaphragm 102 is actually closed by means of the shutter release magnet Mg2 and the mirror 103 is lifted up in such a manner that after then the front shutter plane holding lever 112 is rotated around the shaft 112' along the clockwise direction so as to release the engagement of the front shutter plane 107 with the lever 112.

Thus the front shutter plane 107 starts to run along the direction opposite to the arrow A shown in the drawing. When the front shutter plane 107 starts to run, the shutter time control circuit 126 starts to count the time in accordance with the signal delivered from the shutter time counting switch SW4. The shutter time information (set in advance) has been delivered to the shutter time control circuit 126 from the shutter time information source 119, so that the shutter time control magnet Mg3 is excited when a certain determined shutter time has been counted. By means of the excitation of the magnet Mg3, the rear shutter plane holding lever 113 is rotated around the shaft 113' along the clockwise direction in such a manner that the rear shutter plane 108 starts to run by means of the spring 111 along the direction opposite to the arrow A in the drawing so as to complete the exposure while the switch SW5 is changed over from the NC side to the NO side by means of the brake of the rear shutter plane not shown in the drawing. When the switch SW5 is changed over to the NO side, the circuit 122 is opened, whereby the signal that the switch SW5 has been changed over to the NO side is delivered to the switching circuit 127 in the motor driving device 2 so as to close the switching circuit 127 while the above signal is also delivered to the delay circuit 128, which starts to count a certain determined time. (The delay time to be set at this time at this delay circuit 128 has to be a little longer than the time necessary for the normal winding up. Namely, when for example the time needed for the winding up varies between 400 ms and 700 ms due to the voltage fluctuation of the power source B1 in the motor driving device 2, it is necessary that the delay time of the delay circuit should be set at about 1,000 ms.) When the switching circuit 127 is closed, the motor M starts to run, whereby the front shutter plane 107 as well as the rear shutter plane 107 is moved along the direction of the arrow A so as to charge the shutter and wind up the film. When the winding up operation has been completed, the switch SW5 is changed over from the NO side to the NC side, whereby, by means of the then produced signal, the switching circuit 127 is opened so as to interrupt the current supply to the motor M, which stops quickly, being braked by means of the braking circuit 129.

By means of the repetition of the above mentioned operation, the camera is driven by the motor.

The delay time of the delay circuit 128 is set a little longer than the time needed for the winding up as has been explained above when the winding up operation is carried out in a normal way, the switching circuit 127 is opened in accordance with the signal produced when the switch SW5 is changed over to the NC side in such a manner that the motor M is stopped quickly, being braked by means of the braking circuit 129, while when during the winding up operation the winding up mechanism does not work any more for example because there is no more film, the winding up operation is not completed even after the delay time set at the delay circuit 128 has elapsed. Accordingly, switch SW5 is not changed over to the NC side and therefore the switching circuit 127 remains in the closed state so as to keep the current supply to the motor M in such a manner that at this time the switching circuit 127 is opened by means of the output signal produced when the delay circuit 128 has counted a certain determined time so as to interrupt the current supply to the motor M.

FIGS. 4 to 9 respectively show the important components shown in FIG. 3 in a concrete way, whereby the components presenting the same figures as is shown in FIG. 3 are the same components.

Below the shutter mechanism as well as the film winding up mechanism of the camera body 1 and the mechanical parts of the motor driving device 2 will be explained in accordance with FIG. 4. Elements 201-235 form an exposure control means for the camera.

201 and 202 are respectively the upper and the lower base plate, being respectively supported by means of the support columns 204 and 205. Further, the support column 204 serves as the battery box at the same time in such a manner that the battery corresponding to the power source B2 in the camera body mentioned in accordance with FIG. 3 can be loaded between the upper and the lower base plate.

The shading plate 203 is provided at the photographic opening so as to check the light coming through the lens system as well as to keep the rigidity of the shutter unit casing formed with the base plate, the support columns and so on. The shutter mechanism is mounted on the upper and the lower plate, in which corresponding openings are provided so as to contain the mirror box as is shown in the drawing. Below the shutter mechanism will be explained. The front shutter plane master gear 207 and the rear shutter plane master gear are provided so as to be rotatable around the master shaft provided on the upper base plate 201, whereby the pinion shafts 211 and 212 respectively presenting the front shutter plane pinion 209 and the rear shutter plane pinion 210 respectively in engagement with the front shutter plane master gear 207 and the rear shutter plane gear 208 are born by means of the upper and the lower base plate, while the front shutter plane spring drum 213 (corresponding to the spring 110 shown in FIG. 3), and the rear shutter plane spring drum 214 (corresponding to the spring 111 shown in FIG. 3) are born by means of the upper and the lower base plate in the same way. Further between the respective pinion shafts and the respective spring drums the front shutter plane 107 and the rear shutter plane 108 are provided in the tensed way.

Below the shutter charge mechanism will be explained. On the winding up shaft in the winding up mechanism to be explained later the winding up gear 215 is fixed. The winding up gear 215 is connected with the shutter winding up gear 218 on the master shaft 206 through the winding up transmission gears 216 and 217. The shutter winding up gear 218 presents a fan shaped portion 218a so designed as to rotate the front shutter master gear 207 and the rear shutter master gear 208 respectively by means of the pins 207a and 208a provided on the front shutter plane master gear 207 and on the rear shutter plane master gear 208. 219 is the rear shutter plane holding pin connected with the rear shutter plane pinion shaft 212. 220 is the rear shutter plane holding lever for rotatably connecting the movable piece 222 of the shutter time control magnet Mg3, whereby the lever 220 is restricted against the movement along the counter-clockwise direction by means of the spring 223. The spring 221 serves to charge the rear shutter plane holding lever.

Below, the braking mechanism of the shutter will be explained. At first, the front shutter plane brake will be explained below. 224 is the front shutter plane brake lever, whose one end 224a engages with the pin 207b provided on the front shutter plane master gear 207 immediately before the front shutter plane has completed the running, so as to rotate the brake lever 224 around the not shown brake shaft. At this time the rotation of the brake lever 224 is checked by means of the conventional not shown means such as spring, leather and so on, so as to brake the front shutter plane. The other end 224b of the front shutter plane brake lever engages with the X contact for the speed light, so designed as to close the X contact when the front shutter plane brake lever 224 is rotated along the clockwise direction, the running front shutter plane being braked.

Below, the rear shutter plane brake will be explained. 226 is the rear shutter plane brake lever whose one end 226a engages with the pin provided on the rear shutter plane master gear 208 immediately before the rear shutter plane has completed the running so as to rotate the brake lever 226 around the not shown brake shaft. At this time, the rear shutter plane is braked, the rotation of the brake lever 226 being checked by means of the conventional not shown means such as spring, leather and so on in the same way as in case of the front shutter plane. 227 is the releasing lever, being restricted in the rotation along the clockwise direction by means of the spring 228. 229 is the winding up stop lever, whose one rising up end 229 is to be engaged into the groove 230a of the winding up stop cam 230 to be explained later. Between the winding up stop lever 229 and the release lever 227, a spring 231 is provided in such a manner that the both levers operate as one body with each other. On the folded portion 229b on the rising up part of the winding up stop lever 229 a pin 229c is provided. The pin 229c engages with the forked portion 233a of the contact lever 233 rotatably pivoted on the pin 232a on the fix lever 232. The contact lever 233 is grounded to the camera body so as to constitute the switch SW5 together with the printed plate 234. Namely, when the one end 229a of the winding up stop lever engages into the groove 230a of the winding up stop cam, the winding up stop lever 229 or wind up completion detection means rotates along the clockwise direction whereby the contact lever 233 rotates along the counter clockwise direction through the pin 229c so as to change over the switch SW5 from the NO side to the NC side. When then the shutter is released, the rear shutter plane starts to run, while when the rear shutter plane brake is braked, the rear shutter brake lever 226 rotates along the clockwise direction so as to rotate the winding up stop lever 229 along the counter clockwise direction through the release lever 227 and release the engagement of the one end 229a of the winding up stop lever 229 with the groove of the winding up stop cam while the contact lever 233 is rotated along the clockwise direction so as to change over the switch SW5 from the NC side to the NO side. The NO side of the printed plate 234 is electrically connected to the signal contact P3 of the connector 235 at the side of the camera. The signal terminal P5 is earthed to the camera body. As described above, elements 227, 230 and SW5 form a means to detect completion of exposure.

The film winding up mechanism will be explained below the detail. Elements 20 and 236–241 form the wind up means of the camera. 236 is the winding up shaft on whose lower end the winding up coupler 20 of the camera is fixed so as to carry out the winding up by means of the motor driving device. On the upper portion the film winding up gear 237 making one body with the cam 237a for charging the automatic diaphragm mechanism, the mirror driving mechanism, the automtic exposure control mechanism and so on is fixed. The film winding up gear 237 drives the sprocket 242 as well as the winding up spool through the gears 238, 239, 240 and 241. On the upper part of the winding up shaft 236, the above mentioned winding up gear 215 is fixed and on the most upper part the above mentioned winding up stop cam 230 is fixed. In side of the winding up stop cam 230 an one way clutch 244 is provided, whereby on the wheel 244a of the one way clutch 244 the manual winding up lever 245 is fixed. The one way clutch serves to transmit the winding up power to the winding up shaft 236 in case of the manual winding up by means of the winding up lever 245, but does not transfer the power of the winding up shaft 236 to the winding up lever in case of the motor driven winding up through the winding up coupler 20. 246 is the R button for making the sprocket freely rotatable.

Below, the mechanism of the motor driving device will be explained. M is the driving motor on whose output shaft a bebel gear 247 is provided. The output of the motor M is transmitted to the winding up member or gear 259 through the bevel gear 247, the gears 254–258 rotatably provided on the shaft 249–253 provided on the base plate 248. The upper part of the winding up gear 259 constitutes the circumference of the one way clutch 260. The wheel 260a of the one way clutch is fixed on the winding up shaft of the motor driving device, while on the most upper part of the winding up shaft 261 the winding up coupler 21 of the motor driving device is fixed. The one way clutch 260 is so designed as to transmit the driving power of the motor to the winding up shaft when the motor M rotates along the forward direction so as to carry out the winding up but not to transmit the power of the winding up shaft 236 of the camera to the gears 247, 254–259 and to the motor M when the manual winding up is carried out by means of the winding up lever 245. 262 is the connecting rod by means of which the R button 246 is pushed from the side of the motor driving device when the motor driving device is mounted on the camera. 263 is the connector at the side of the motor driving device, presenting the signal terminals P4 and P6 explained in accordance with FIG. 3. The signal terminals P4 and P6 are respectively and electrically connected to the signal terminals P3 and P5 at the side of the camera 302 is the circuit in the motor driving device to be explained later.

Figure 5:
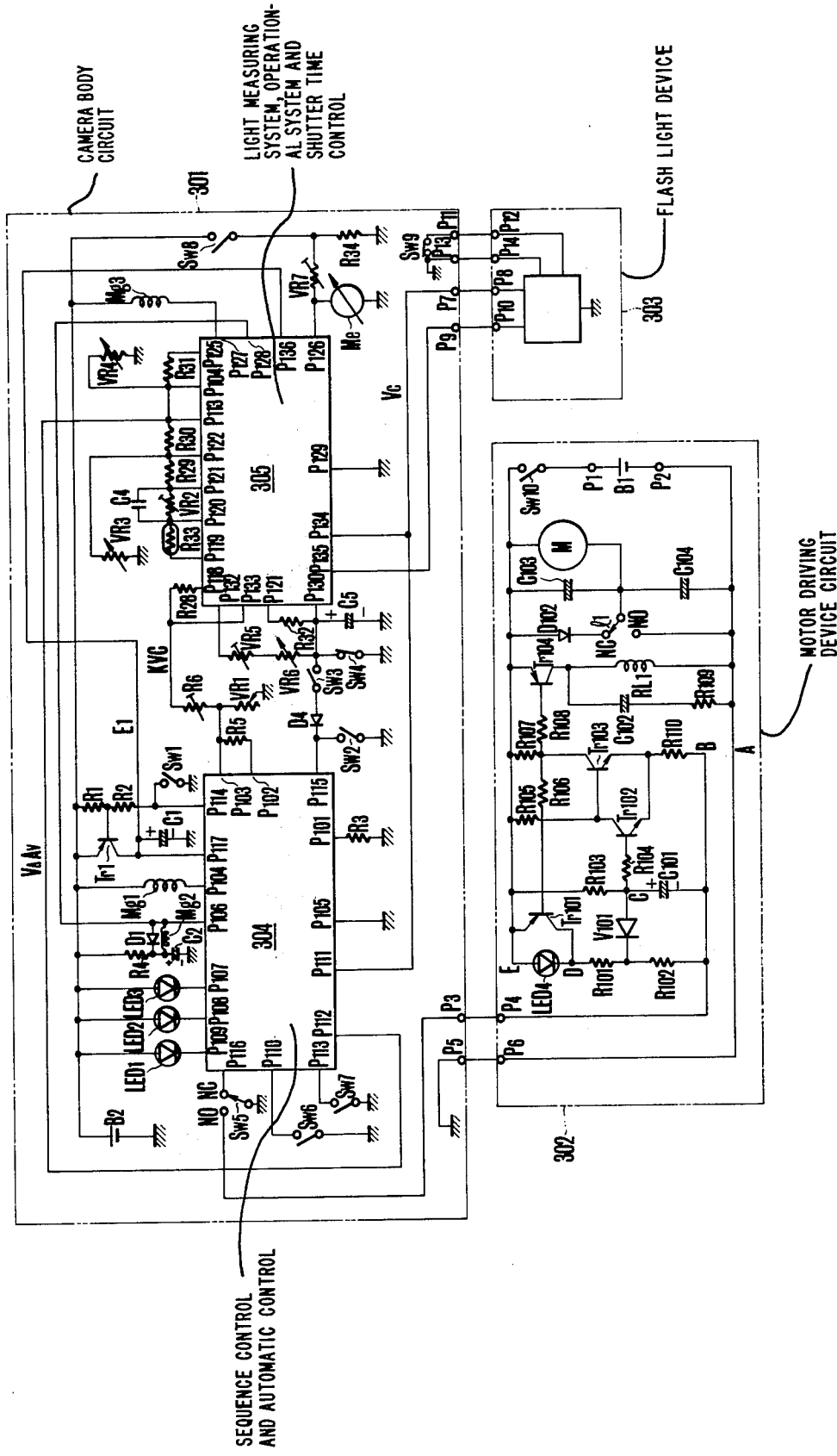
FIG. 5 shows a detailed circuit diagram of the diagram shown in FIG. 3.
Figure 6:
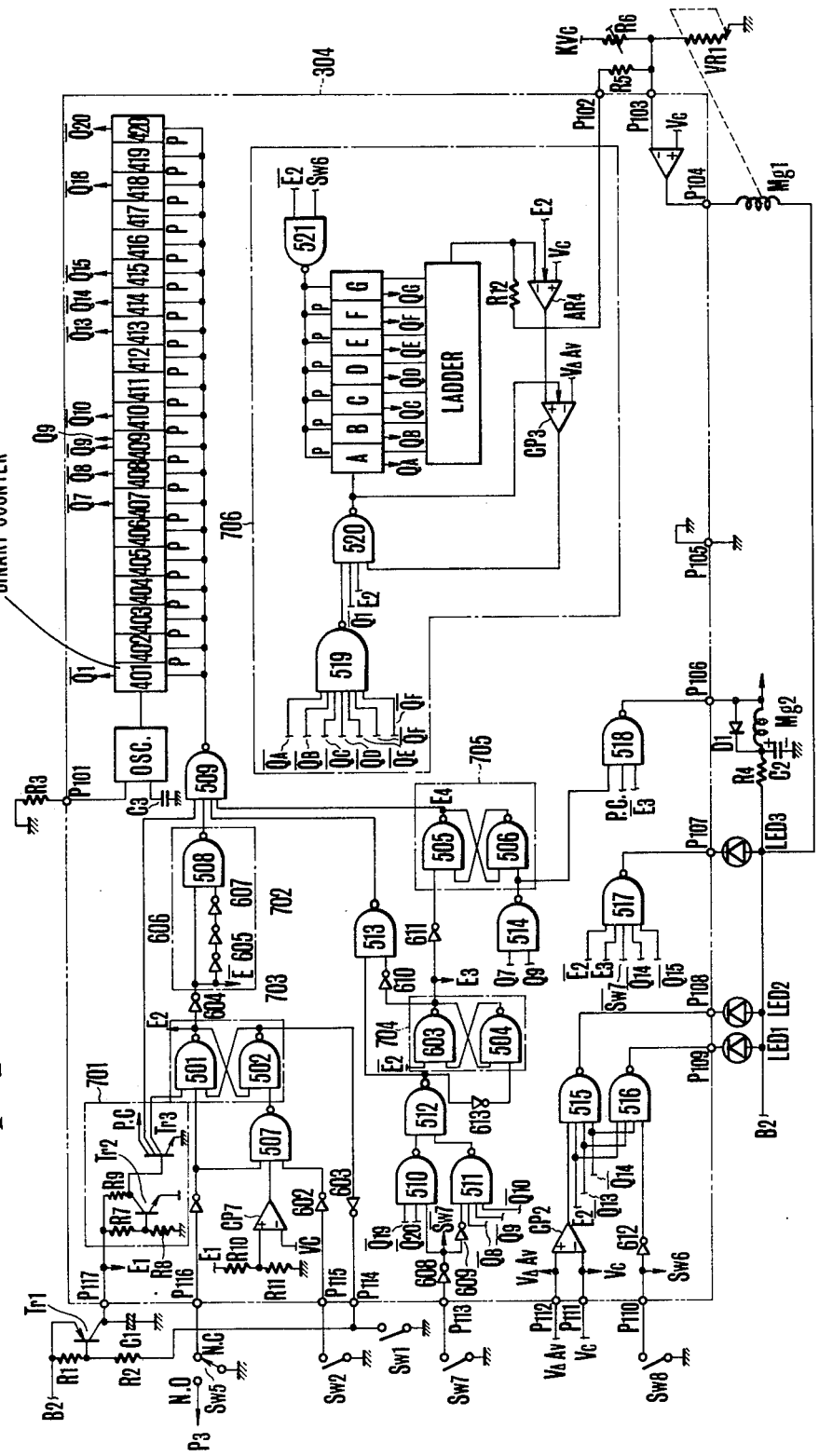
FIG. 6 shows a detailed circuit diagram of the control circuit 304 at the side of the camera shown in FIG. 5.

FIG. 5 shows the circuit in the camera body and the motor driving device. 301 is the circuit, or circuit means in the camera body, 302 the circuit in the motor driving device and 303 the flash light device in the speed light device. At first the circuit in the camera body will be explained in detail below. B2 is the power source in the camera body, whereby the negative side is earthed to the camera body. 304 is the sequence control and automatic exposure control part consisting of the integrated circuit such as L.S.I., while 305 is the light measuring system, the operational system and the shutter time control part consisting of L.S.I. The control part 304 is constituted as is shown in FIG. 6. Namely 401–420 constitute a binary counter or timer so designed that when P is "1", the output of the counter Qn is "1" and $\overline{Q}n$ is "0", whereby P is the preset input terminal. OSC is the R oscillator so designed as to oscillate with the frequency determined by the R3 and C3. The binary counter 401–420 and the CR oscillator OSC constitute the digital timer circuit. A—G constitute a binary counter so designed that when P="1", the output of the counter Qn="1" and $\overline{Q}n$="0", whereby P is the preset input terminal. 501–521 are the NAND gates and 601–613 the inverters, whereby they are connected to each other as is shown in the drawing. 701 constitutes a power up clear circuit while 702 constitutes a one shot circuit. 703–705 constitute a flip-flop circuit while 706 constitutes an AD-DA converter. R7–R12 are the resistances, and P101–P117 the terminals of L.S.I.

Figure 7:
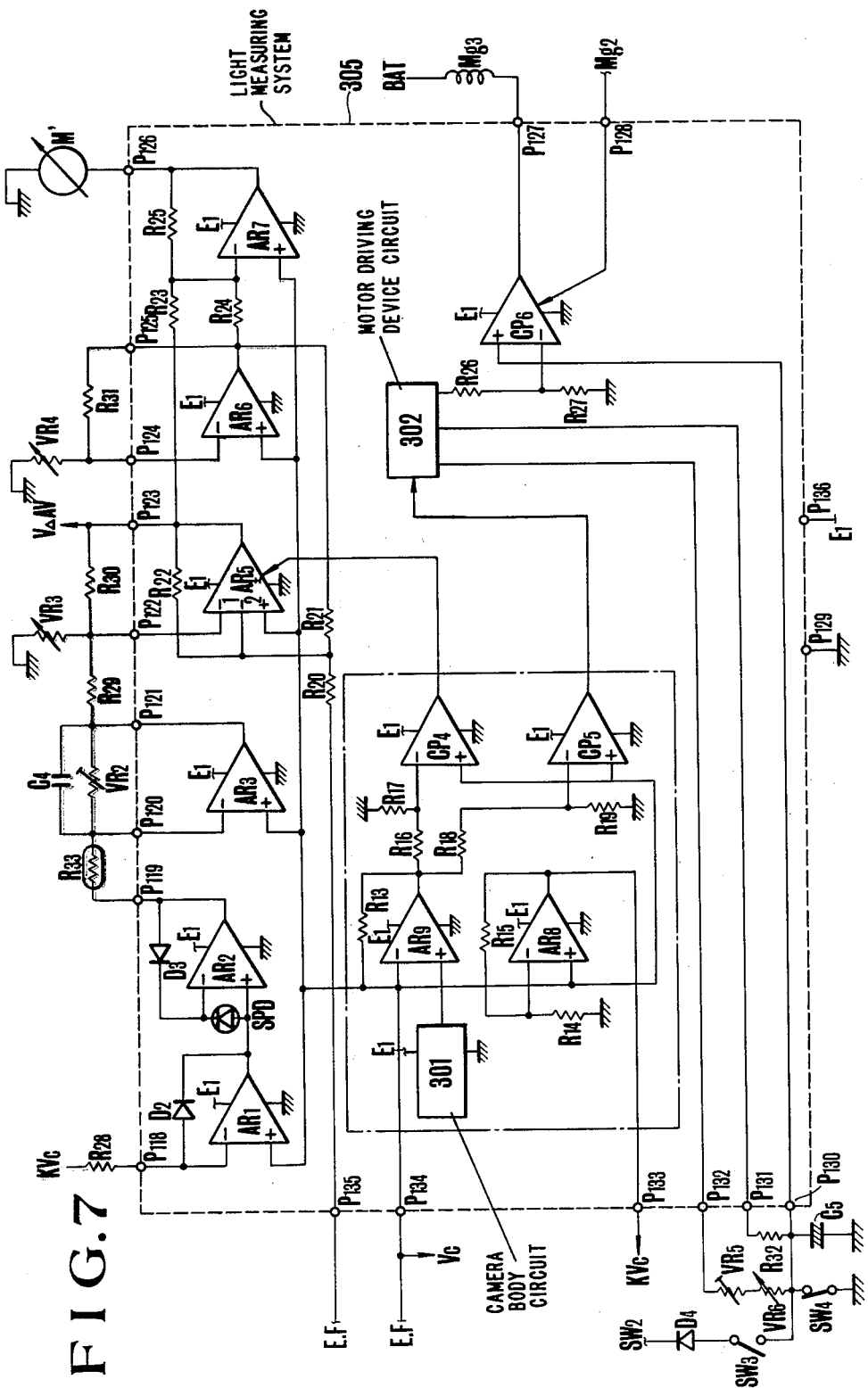
FIG. 7 shows a detailed circuit diagram of the control circuit 305 at the side of the camera shown in FIG. 5.
Figure 9:
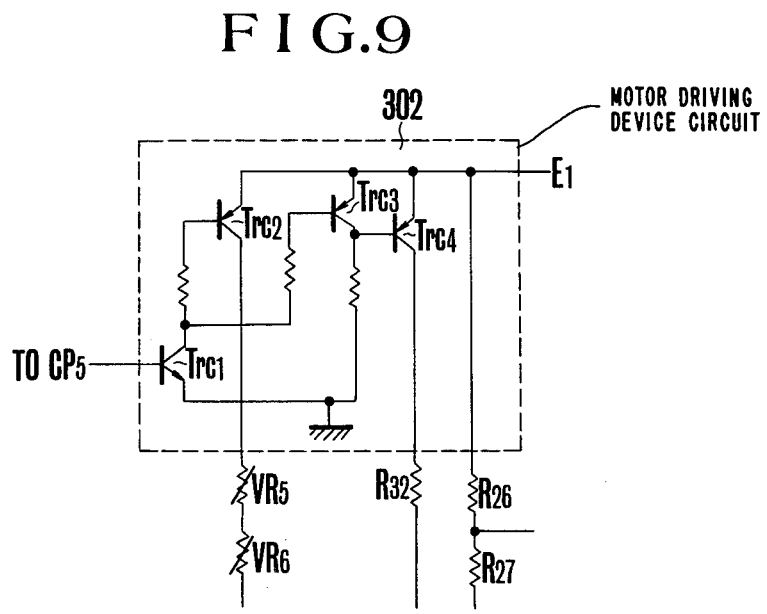
FIG. 9 shows a detailed circuit diagram of the change over circuit shown in FIG. 7.

Further, the control part 305 is constituted as is shown in FIG. 7. Namely P118–P136 are the terminals of L.S.I., AR1–AR9 the operational amplifier and CP4–CP6 the comparaters, whereby AR5 and CP6 are controlled by means of the control input (arrow). 301 is the constant voltage source and 302 the change over switch consisting of the transistors Trc1, Trc2, Trc3 and Trc4 as is shown in FIG. 9. SPD is the silicone photo diode for the light measurement while D3 is the log diode with the logarithmically compressing characteristics. R33 is a posister, C4 and VR2 a circuit for eliminating the rapid fluctuation of the measured light value due to the flickering of the light source for illuminating the object, VR3 the shutter time information and the film sensitivity information setting variable resistance, VR4 the input variable resistance for the compensation information of the F-value of the lens with the totally opened diaphragm, M the display meter, VR5 the shutter time adjusting variable resistance in case of the short shutter time, VR6 the shutter time setting variable resistance and C5 the capacitor of the time constant circuit.

The illuminating diode LED1 connected to the terminal P109 of the control part 304 is connected between the positive side of the power source B2 and the terminal P109 so as to flicker in case the camera is set in the manual photographic mode. The illuminating diode LED2 is connected between the positive side of the power source B2 and the terminal P108 so as to display the low brightness alarm. LED1 and LED2 are provided so as to be displayed in the view finder (corresponding to LED shown in FIG. 3). The illuminating diode LED3 is connected between the positive side of the power source B2 and the terminal P107 so as to twinkle in case the camera is set in the self-timer photographic mode; being provided on the front surface of the camera although not shown in the drawing. Between the positive side of the power source B2 and the earth the resistance R4 and the condenser C2 for the excitation of Mg2 are connected in series, whereby between the middle point and the terminal P106 the shutter release magnet Mg2 and the noise eliminating diode D1 are connected. Between the positive side of the power source B2 and the terminal P104 the automatic exposure control magnet Mg1 is connected. The emitter of the power source control transistor Tr1 is connected to the positive side of the power source B2 while the collecter is connected to the terminal P117. Further the base is connected to the terminal P114 through the resistance and at the same time grounded through the light measuring and display switch SW1. The terminal P116 is connected to the NC side of the switch SW5. The NO side of the switch SW5 is connected to the motor driving device through the signal terminal P3 at the side of the camera as has already been explained in accordance with FIG. 4. The signal terminal P5 at the side of the camera is grounded to the camera body. SW6 is the auto-manual change over switch connected between the terminal P110 and the earth while SW7 is the self-timer setting switch connected between the terminal P112 and the earth. SW2 is the exposure control and the shutter release switch connected between the terminal P115 and the earth so as to be closed by means of the second stroke of the release button. (FIG. 3). SW3 connected in series with the diode D4 between the terminals P115 and P130 is the bulb switch so as to be closed when the camera is set in the bulb photographic mode (when the shutter dial 120 is set at bulb). Between the terminal P132 and the ground the short shutter time adjusting variable condenser VR5, the shutter time setting resistance VR6 and the shutter time setting condenser C5 are connected in series so as to produce the appointed shutter time. VR5 is the variable resistance whose value is varied by means of rotating the shutter dial 120. The middle point between the variable resistance VR6 and the condenser C5 is connected to the terminal P130 and at the same time earthed through the shutter time counting switch SW4. The variable resistance VR1 connected between the terminal P103 and the earth serves to determine the aperture value, being in functional engagement with the aperture preset mechanism, whereby the composition has already been known for example from the Japanese Patent Application No. Sho 49-3252 (Japanese Patent Publication No. Sho 50-98321), so that the explanation is omitted here.

VR3 is the variable resistance for the information input such as of the shutter time, the film sensitivity and so on, being connected between the terminal P122 and the ground. VR4 is the variable resistance for the information input such as of the aperture adjusting and so on, being connected between the terminal P124 and the earth. Between the power source B2 and the terminal P127 the shutter time control magnet Mg3 is connected. Me is the meter for displaying the aperture value in the view finder, being connected between the terminal P126 and the earth. SW8 is the battery checker switch to be closed by pushing down the checker button 23 (FIG. 1). R34 is the load resistance of the checker, while the variable resistance VR7 is for the adjustment. By closing the checker switch SW8, the pointer of the meter Me parallel to the load resistance Rs4 swings so as to check the voltage of the power source B2. The line to be connected to the circuit 303 in the speed light device through the terminals P111, P134, P7 and P8 serves to automatically change over the shutter time as well as the aperture value into those suited for the speed light photography when the speed light device is mounted on the speed light device. The line to be connected to the circuit 303 in the speed light device through the terminals P135, P9 and P10 serves to set the selected aperture value. The switch SW9 is the X contact corresponding to 225 in FIG. 4, to be connected to the circuit in the speed light device.

Below the circuit composition in the motor driving device will be explained in detail. B1 is the electrical power source of the motor driving device, SW10 the main switch of the motor driving device and M the driving motor. LED4 is the illuminating diode or display means for the auto stop display, whereby the anode is connected to the positive side of the power source B1 through the main switch SW10 while the cathode is connected to the signal terminal P4 of the motor driving device through the resistances R101 and R102. The signal terminal P6 is connected to the negative side of the power source B1. The resistance R103 and the condenser C101 constitute an RC timer for determining the time constant of the delay circuit 128 shown in FIG. 3. As has already been explained in accordance with FIG. 3 the time of the timer has to be set longer than the winding up time. $RL_1$ is the relay coil of the electromagnetic relay, being connected in series to the transistor $Tr_{104}$.

$l_1$ is the relay contact or switching means to be changed over from the NC side to the NO side, when the relay coil $RL_1$ or change-over means is excited, namely the transistor or switching means Tr104 is brought into the switched on state. The condenser C102 and the resistance R109 constitute a delay means for chattering prevention of the switch SW5. Namely, when the switch SW5 is changed over to the NO side, the transistor Tr104 is brought into the switched on state through the trnsistor Tr102 and Tr103 so as to excite the relay coil $RL_1$, whereby also the condenser C103 is charged. When then the switch SW5 is opened for a moment due to the chattering, also the transistor Tr104 is brought into the switched off state through the transistor Tr102 and Tr103, whereby the relay coil $RL_1$ is kept in the excited state by means of the charge in the condenser C102. D102 is the diode or one-way constructing element for allowing the backward running of the motor when the relay contact is at the NC side. The condensers C103 and C104 are those for checking the noises of the motor M and the relay coil $RL_1$.

Figure 8:
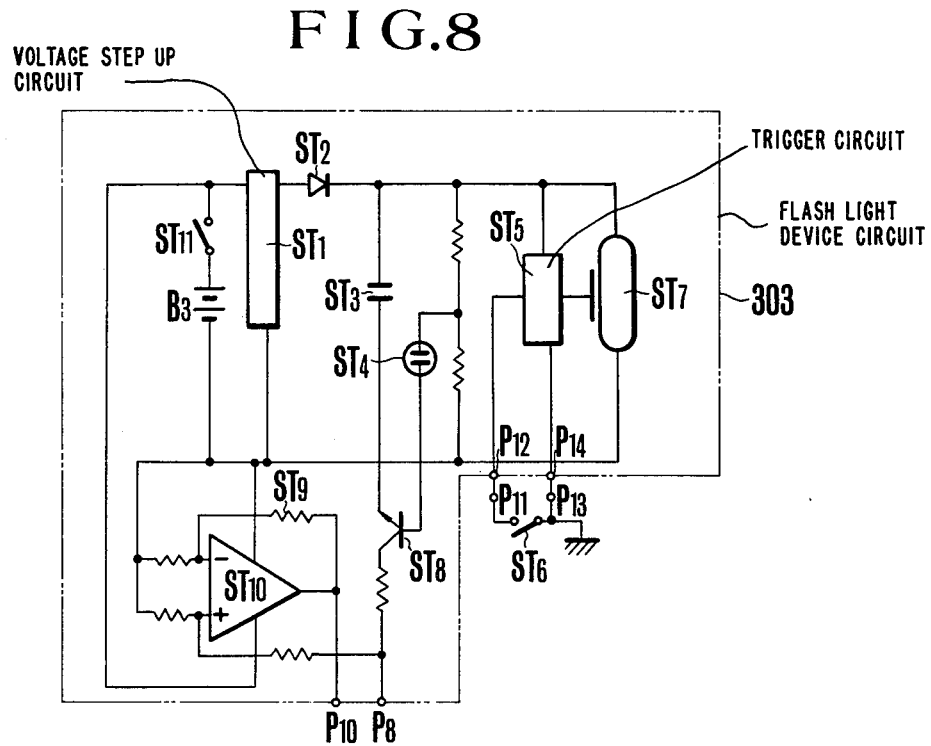
FIG. 8 shows a detailed circuit diagram of the flash light circuit in FIG. 5.

Hereby the flash light circuit 303 is composed as is shown in FIG. 8. Namely, $ST_1$ is the voltage step up circuit, $ST_2$ the diode for rectifying the output of the voltage step up circuit $ST_1$, $ST_3$ the main condenser, $ST_4$ the neon tube, $ST_5$ the trigger circuit, $ST_6$ the synchronization switch, $ST_7$ the discharge tube, $ST_8$ the transistor, $ST_9$ the resistance whose resistance value corresponds to the aperture value for the flash light photography, $ST_{10}$ the operational amplifyer, $ST_{11}$ the power source switch and B3 the battery.

Figure 10:
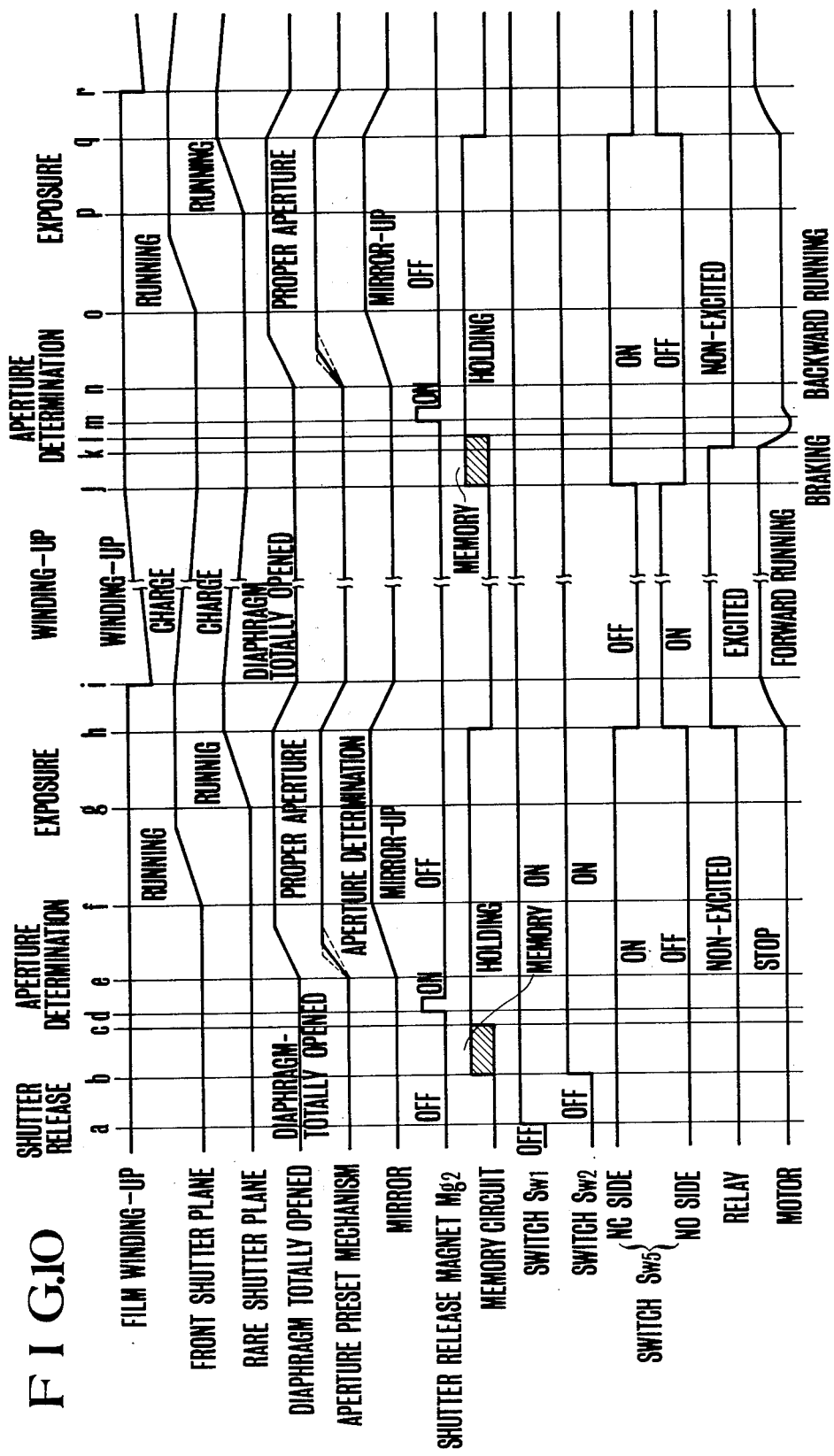
FIG. 10 shows a diagram for explaining the operation of the circuits shown in FIGS. 6 and 5.

Below, the operation of the embodiment of the present invention shown in FIGS. 4–9 will be explained in detail in accordance with the timing charts shown in FIGS. 10 and 11. Hereby the camera body and the motor driving device are in the wound up state. When the release button 114 (FIG. 1) of the camera is pushed down by means of the finger, the light measuring and display switch $SW_1$ shown in FIG. 5 is closed with the first stroke (point a in FIGS. 10 and 11) so as to bring the transistor Tr1 in the switched on state through the resistance R2. When this transistor Tr1 is brought in the switched on state, a voltage $E_1$ is applied to the circuit so as to actuate the circuit. At first, the light beam from the object to be photographed reaches the light sensing photo voltaic element SPD through the photographic lens of the camera in such a manner that SPD produces a photoelectric current corresponding to the brightness of the object. This signal is amplified with the operational amplifier AR2 presenting a logarithmic characteristics element D3 in the feed back line in such a manner that the brightness information (Bv) is produced at the output terminal of the amplifier AR2. In order to compensate the variation of the log. diode D3 due to the temperature the operational amplifier AR1 presenting a diode D2 with the same characteristics as that of D3 in the feed back line and a posister R33 are provided at the output side. Further the output of AR2 is delivered to the operational amplifier AR3 through the posister R33, whereby the higher harmonics of the signal is attenuated by means of the characteristics C4 and VR2 in such a manner that the fluctuation of the output due to the flickering is eliminated. The brightness information (Bv) from AR3 is delivered to the inverting input terminal of the operational amplifier AR5 through the resistance R29. Further the shutter time information (Tv) and the film sensitivity information (Sv) set at the variable resistance VR3 are applied to the inversing input terminal of the operational amplifier AR5 so as to be operated in AR5. AR5 produces the diaphragm closing step number information $V_{\Delta AV}$ which is taken out from the terminal P25 so as to be transmitted to the sequence and automatic exposure control circuit 304. Further this diaphragm closing step number information $V_{\Delta AV}$ is combined with the output by means of AR6, of the smallest aperture value information (Avo) of the lens set at VR4 in such a manner that the information (Av) corresponding to the aperture value is obtained and displayed by means of the aperture value display meter M for example in the view finder.

On the other hand, when the voltage $E_1$ is applied to the circuit, the oscillator OSC starts to oscillate with the frequency determined with the resistance R3 and the condenser C3 so as to transmit the clock to the counter. Further, when the voltage $E_1$ is applied to the circuit, the output of the power up clear circuit 701 becomes "0" for an instant due to the circuit 701 so as to preset the counter 401–420 through the NAND gate 509 and at the same time to set the Flip-Flop 703 at the initial state (E2="1").

Then by means of the signal ($\overline{E2}$="1") and of the signal that 401–420 have been reset, the Flip-Flop 704 is also set at the initial state (E3="1").

Further by means of the signal (E3="1"), the Flip-Flop 705 is set at the initial state (E4="1").

Further by means of the signal (E2="1", namely $\overline{E2}$="0") the counter A–G constituting the AD–DA converter are also preset.

Further by means of the signal (E2="1"), the output of the operational amplifier AR4 is controlled in such a manner that the output potential is lowered down to GND (each potential) so that no current can be supplied to the automatic exposure control magnet Mg1 only by means of closing SW1.

When now the photographic mode has been set at the manual photographic mode, the auto-manual change over switch SW6 is closed so that the output of the inverter 612 is "1" while one of the NAND gates 516 produces "1".

Further E2="1", so that LED1 flickers only when $\overline{Q13}$="1" and $\overline{Q14}$="1". Thus, the periodical flickers of LED1 display in the view finder that the camera is set at the manual photographic mode, When the camera is in the automatic photographic mode, the switch SW6 is opened so that the LED1 remains in the switched off state. When the brightness of the object is too low, the output $V_{\Delta A V}$ of the SPD cell for sensing the light beam coming from the object through the photographic lens is smaller than Vc (Ve:standard voltage) so that the output of the comparator CP2 becomes "1", whereby E2="1", so that LED2 flickers only when Q13="1" and Q14="1". Thus the LED2 flickers every time when one pulse comes from the oscillator OSC, namely with the frequency of the pulses so as to display the low object brightness alarm in the view finder, informing the photographer that no proper aperture value for the proper exposure can not obtained with the set shutter time. In this case the shutter time has to be adjusted from the beginning (corresponding to the display circuit 115 in FIG. 3).

When the release button is further pushed down, the switch SW2 is closed with the second stroke in such a manner that the output of the inverter 602 becmes "1". Further the switch SW5 has been closed at the NC side so that the output of the inverter 601 is already "1".

When then the voltage of $E_1$ is higher than the serviceable one after comparing the voltage $E_1$ divided by means of $R_{10}$ and R11 with the constant voltage Vc, the output of the comparator CP7 becomes "1". Thus all of the inputs of the NAND gate 507 becomes "1", so that the output of 507 becomes "0" in such a manner that the Flip-Flop 703 is inverted whereby E2 is altered from "1" into "0". (b. and j in FIGS. 10 and 11). When E2 becomes "0", one gate of the NAND gates 515 and 516 produce "0", so as to put out LED1 and LED2. Further, when E2 becomes "0", the output of the inverter 603 becomes also "0", so as to absorb the base current of the transistor Tr1 in such a manner that the transistor Tr1 remains in the switched on state even if the switches SW1 and SW2 are opened (corresponding to the self-holding circuits 123, 123' in FIG. 3). Further, when E2 changes out of "1" into "0" the output of the inverter 604 changes from "0" into "1", in such a manner that the output of the inverter 604 becomes "0" during the time delayed by the inverters 605–607. Thus, the output of the NAND gate 508 becomes "1"for an instance so as to preset the counters 401–420 from the beginning and start the counting.

Further, when E2 is changed over from "1" to "0", the control of the operational amplifier AR4 is released so as to supply current to the automatic exposure control magnet Mg1. The signal of the output $\overline{Q}$ of the counter is transmitted to the counter A-G through the NAND gate. When now the camera is set in the manual photographic mode, the automanual change over switch SW6 is closed, whereby the output of the NAND gate 521 remains "1" so that the counter A-G remains in the preset state. When now the camera is set in the automatic photographic mode, the switch SW6 is opened, whereby the output of the NAND gate 521 is changed from "1" into "0" so that the counter A-G starts to count until the voltage $V_{\Delta A V}$ at the inversing input side of the comparator CP3 becomes equal to the output of the operational amplifier AR4, when the CP3 is inverted so as to interrupt the gate 520 and to stop the counter (point C in FIG. 10). $V_{\Delta A V}$ at this time is the output of the proper aperture value operated by the light measuring system, the operation system and the shutter time control part 305 in accordance with the measured light value, the shutter time, the film sensitivity and so on, which means that the counter 706 has memorized the proper aperture value. Thus the comparator CP3 is controlled by means of the clock output of the NAND gate lest it should be influenced by the noise produced when the counter 706 carries out the counting. When now the camera is set in the self-timer photographic mode, the self-timer set switch SW7 is closed whereby the output of the inverter 608 is "1" so that when both $\overline{Q18}$ and $\overline{Q20}$ become "1", the output of the NAND gate 510 changes from "1" to "0". Thus, the output of the NAND gate 512 changes from "0" to "1" while the output of the inverter 613 changes from "1" to "0" so as to inverse the state of the Flip-Flop circuit 704, whereby the output E3 changes from "1" to "0".

In consequence, the output of the NAND gate 509 becomes "1", whereby the counter 401 respectively 420 is preset from the beginning, when the output of the NAND gate 509 becomes "0" and the counting is started from the beginning.

Further when the switch SW7 is closed, the illuminating diode LED3 lights up so as to display the self-timer photographic mode only when both $\overline{Q14}$ and $\overline{Q15}$ are "1", and is put out at the termination of the self-timer operation, namely when E3 becomes "0".

When now the camera is not set in the self-timer photographic mode, the self-timer set switch SW7 is opened and therefore the output of the inverter 608 is "0" while the output of the inverter 609 is "1", so that the output of the NAND gate 511 changes from "1" to "0". When $\overline{Q8}$, $\overline{Q9}$ and $\overline{Q10}$ become altogether "1". Namely E3 changes from "1" to "0" after the lapse of the time (about 10 seconds) determined by $\overline{Q}18$ and $\overline{Q}20$ in case the camera is set in the self-timer photographic mode (when the switch SW7 is closed) and after the lapse of the time (about 10 ms.) determined by $\overline{Q}8$, $\overline{Q}9$ and $\overline{Q}10$ when the camera is not set in the self-timer photographic mode (in case the switch SW7 is opened) (points d and m in FIGS. 10 and 11). Namely, E3 changes from "1" to "0" in the normal photographic mode almost at the same time with the second stroke of the release button (the time scales are shown enlarged in the timing charts shown in FIGS. 10 and 11 in order that it can be easily understood that the light measuring and memory operation are carried out while the switch SW2 is closed and a current is supplied to the magnet Mg2).

When E3 changes from "1" to "0", the output $\overline{E}3$ of the inverter 611 changes from "0" to "1" so as to excite the shutter release magnet Mg2. The magnet Mg2 is kept being excited until both $\overline{Q}7$ and $\overline{Q}9$ become "1". When both $\overline{Q}7$ and $\overline{Q}9$ become "1" the output of the NAND gate 514 becomes "0", so as to switch off the release magnet Mg2 while the Flip-Flop circuit 705 is inversed so as to change E4 from "1" to "0", whereby the output of the NAND gate 509 becomes "1"0 so as to bring the counter 401 respectively 420 in the preset state. Further the signal for exciting the shutter release magnet Mg2 is delivered from the terminal P28 so the comparator CP6 so as to control CP6, whereby the magnet Mg3 is excited with the output of P23 so as to hold the rear shutter plane.

When the release magnet Mg2 is excited, the preset diaphragm lever is driven as has been explained in the outline way in accordance with FIG. 3 (e in FIG. 10) in such a manner that the varible resistance VR1 (FIG. 5 and FIG. 6) fixed on the preset diaphragm lever varies the value until a proper aperture value is reached in comparison with the output of AR4, when the comparater CP1 is inversed so as to switch off the automatic exposure control magnet Mg1 and clamp the diaphragm. Further the mirror is lifted up and the diaphragm is automatically closed by means of the release magnet Mg2. The mechanism and the operation of this automatic exposure control part are explained in detail in the specification of the application with the afore mentioned number and have nothing to do directly with the present invention, so that the explanation is omitted here. When the mirror is lifted up while the diaphragm is automatically closed, the engagement of the not shown front shutter plane holding lever (corresponding to 112 in FIG. 3) is released by means of the release signal from the automatic diaphragm mechanism in such a manner that the front shutter plane master gear 207, the pinion 209 and the shaft in FIG. 4 rotate so as to allow the front shutter plane 107 to start to run (f in FIG. 10). At the same time the shutter time count switch SW4 is opened with the operation of the front shutter plane holding lever. Immediately before the front shutter plane 107 has completed its running, the one end 224a of the front shutter plane brake lever 224 engages with the pin 207b provided on the front shutter plane master gear 207 so as to brake the front shutter plane and stop it. At this time the X contact 225 is closed by means of the clockwise rotation of the front shutter plane brake lever 224.

When the shutter time count switch SW4 is opened, Cs starts to be charged through the shutter time resistances VR5 and VR6 in FIG. 5, whereby the terminal voltage is applied to the non inversing input of the comparater CP6. This signal is compared with the standard voltage from the change over means 302 divided by R26 and R27 in CP6 until they coincides with each other, when CP6 is inversed so as to switch off the shutter time control magnet Mg3. When the shutter time control magnet Mg3 is switched off, the movable piece 222 of the magnet Mg3 in FIG. 4 is rotated along the counter-clockwise direction by means of the spring 223 so as to release the engagement of the rear shutter plane holding lever 220 with the rear shutter plane holder 219, whereby the rear shutter plane pinion shaft 212 making one body with the rear shutter plane holder 219 and the rear shutter plane master gear 208 are rotated by means of the rear shutter plane spring drum 214 so as to allow the rear shutter plane 108 to run and complete the exposure (g in FIGS. 10 and 11). Immediately before the rear shutter plane 108 has completed the running, the one end 226a of the rear shutter plane brake lever 108 engages with the pin 208b provided on the rear shutter plane master gear 208 so as to brake the rear shutter plane and stop. At this time by means of the strength of the rear shutter plane the rear shutter plane brake lever 226 is rotated along the clockwise direction, while the release lever 227 is rotated along the counter-clockwise direction against the strength of the spring 228 because the one end of the release lever 227 is pushed by the rear shutter plane brake lever 226. When now there is no excessive force exercised on the winding up shaft from the motor driving device and so on, there is no excessive friction between the notch 230a of the winding up stop cam 230 and the rising up part 229a at the one end of the winding up stop lever 229 so that when the release lever 227 is rotated along the counter-clockwise direction, the winding up stop lever 229 is also rotated along the counter-clockwise direction as one body by means of the spring 231. When there is an excessive force exercised on the winding up shaft 236, due to the friction between the rising up part 229a at the one end of the winding up stop lever 229 and the notch 230a of the winding up stop cam 230 the winding up stop lever 229 can not rotate even if the release lever 227 rotate along the counter-clockwise direction, whereby only the spring 231 is charged. At the time point at which the excessive force exercised upon the winding up shaft 236 is removed, the winding up stop lever 229 is rotated along the counter-clockwise direction by means of the strength of the spring 231 charged by the reaction of the overload to be explained later. When the winding up stop lever 229 is rotated along the counter-clockwise direction, the rising part 229a at the one end escapes from the groove 230a of the winding up stop cam 230 so as to release the winding up stop, whereby the pin 229c provided at the folded part 229b is rotated along the counter-clockwise direction while the contact lever born on the pin 232a of the fixed lever 232, whose folked part 233a is engaged with the pin 229c of the winding up stop lever, is rotated along the clockwise direction so as to change over the switch SW5 from the NC side to the NO side (h in FIG. 10).

When the switch SW5 is changed over from the NC side to the NO side, the output of the inverter in FIG. 6 becomes "0", so as to inverse the state of the Flip-Flop 703, whereby E2 changes from "0" to "1". Hereby also the output of the inverter 603 changes from "0" to "1", so as to release the holding of the transistor Tr1. When E2 changes from "1" to "0", also the Flip-FLop 704 is inversed, whereby E3 changes from "0" to "1", when also the Flip-Flop 705 is inversed, whereby E4 changes from "0" to "1" while the output of the NAND gate 509 changes from "1" to "0", so as to start the counter again, resetting the whole state (consequently also the memory circuit is reset), whereby LED1 light up again in case of the manual photographic mode while LED2 lights up again in ease of the low brightness alarm.

When the switch SW5 is changed over from the NC side to the NO side, the potential at the point B as well as the point C of the circuit 302 in the motor driving device lowers in FIG. 5. The current running through the resistance R103 charges the condenser C101 so that no current runs through the resistance R104 whereby the transistor Tr102 is brought in the switched off state. A current runs to the base of the transistor Tr103 through the resistance R105 so as to bring the transistor Tr103 in the switched on state whereby a current runs through the transistor Tr104, the resistance R108, the transistor Tr103, and the resistance R110 so as to bring the transistor Tr104 in the switched on state while a current runs through the relay coil RL1. The condenser C102 and the resistance R109 make the current running through the relay coil RL1 smooth so as to prevent the chattering of the relay. When a current runs through the relay coil RL1, the relay switch $l_1$ is changed over from the NC side to the NO side so as to supply the current to the motor M and rotate the motor M (the time at the point 1 in FIG. 10 and from the point h to the point 1 in FIG. 10 is the time lag due to the starting of the motor M). The rotation of the motor M is transmitted to the winding up coupler 20 at the side of the camera through the gears 247, 254–259 in FIG. 4, the one way clutch 260, the winding up shaft 261 and the winding up coupler 21. When the winding up coupler 20 making one body with the winding up shaft 236 of the camera rotates, the sprocket 242 and the spool 243 making also rotate through the gear 237, the gears 238 to 241 making as one body with the winding up shaft so as to wind up the film. Further by means of the cam 237a making as one body with the gear 237, the automatic exposure control mechanism, the automatic diaphragm mechanism, the mirror up mechanism and so on are charged. When the winding up shaft 236 rotates, the winding up gear 215 making one body with the winding up shaft 236 rotates so as to rotate the shutter winding up gear on the master shaft 206 through the winding up transmission gears 216 and 217. On the winding up 218 a fan shaped portion 218a is provided so as to rotate the front shutter plane master gear as well as the rear shutter plane master gear through the pin 207c on the front shutter plane master gear 207 respectively through the pin 208a on the rear shutter plane master gear. Thus the front pinion shaft 211 and the rear pinion shaft 212 rotate so that the shutter planes 107 and 108 are wound up at the side of the pinion shaft so as to charge the spring in the spring drums 213 and 214.

When the front shutter plane master gear 207 is rotated up to the position at which the gear 207 is kept by the holding lever, the rear shutter plane holder 219 connected with the rear shutter plane pinion shaft 212 also comes to the position at which the holder 219 is kept by the holding lever 220. Because at this time the one end 221a of the charge spring 221 is charged along the upward and left direction in FIG. 4 by means of a member connected with the winding up cam 237a, the movable piece 222 is in contact with the shutter time control magnet Mg3 whereby the rear shutter plane holder 219 is kept by the rear shutter plane holding lever 220. When the shutter has been charged, by means of the notch of the winding up gear 215 the engagement of the gear 215 with the winding up transmission gear 216 is interrupted so that the shutter winding up gear 218 returns to the position before winding up together with the transmission gear 216 and 217. After the shutter has been charged, the winding up operation by means of the motor M is further continued until the winding up of the film is completed, whereby all the winding up operation are completed. At the time point at which all the winding operations are completed, the rising up portion at the one end 229a of the winding up stop lever 229 reaches the position at which the rising up portion 229a engages in the groove 230a of the winding up stop cam 230 rotating as one body with the winding up shaft 236 so that the winding up stop lever 229 is rotated along the counter-clockwise direction by means of the spring 228 through the releasing lever 229 until the rising up portion at the one end 229a of the winding up stop lever 229 engages in the groove 230a of the winding up stop cam 230. (Because the rear shutter plane master gear 208 was already charged at the beginning of the winding up, the rear shatter brake lever 226 has been rotated along the counter-clockwise direction so that the holding of the release lever has been released.) At the same time, the winding up stop lever is rotated along the clockwise direction, the pin 229c provided at the folded part 229b is also rotated along the clockwise direction, while the contact lever whose folked part 233a engages with the pin 229c is rotated along the counter-clockwise direction in such a manner that the switch SW5 is changed over from the NO side to the NC side (j in FIG. 10).

When the switch SW5 is changed over from the NO side to the NC side, the signal terminals P4 and P6 of the circuit 302 in the motor driving device are opened in FIG. 5, so that the electrical potential at the point B is raised so that no current runs through the transistor Tr104, the resistance R108, the transistor Tr103 and the resistance R110 any more whereby the transistor Tr104 is brought into the switched off state. However, when the transistor Tr104 is brought into the switched off state the charge of the condenser C102 runs into the relay coil RL1 through the resistance R109, the relay RL1 is switched off after the lapse of the time (about 8 ms.) determined by the condenser C102 and the resistance R109 after the transistor Tr104 is brought into the switched off state (namely, after the switch SW5 has been changed over to the NC side) (k in FIG. 10).

The time determined by the condenser C102 and the resistance R109 is about several ms. which is the delay time during which various mechanisms have been wound up by means of the motor M without fail even if the timing at which the switch SW5 is changed over from the NO side to the NC side and the timing during which various mechanisms have been wound up are not precise enough due to the insufficient precision of the parts. When the relay coil RL1 is switched off the relay switch $l_1$ is changed over from the NO side to the NC side the current due to the counter-electromotive force of the motor runs through the diode D102 so as to stop the motor M quickly. When the motor M stops quickly the gears 247, 254 to 259 shown in FIG. 4 stop also, whereby in case the voltage of the power soure $B_1$ of the motor driving device is high, due to the moment of inertia of the gears the winding up shaft 261 runs more than the determined angle so as to apply an overload to the winding up shaft 236 of the camera. This overload is removed by rotating the gears 247, 254 to 259 and the motor M along the direction opposite to that at the time of the winding up due to the reaction of the torsion of the winding up shaft 236 and so on, whereby this overload can completely be removed because the motor is not braked by means of the diode 102 when the motor M is rotated along the backward direction.

Further, when the release button 114 is being pushed at the time at which the switch SW5 is changed over from the NO side to the NC side, in the circuit 301 in the camera body in FIGS. 5 and 6 the output of the inverter 601 becomes "1" due to the change over of the switch SW5 to the NC side. At this time, the switches SW1 and SW2 are closed, the current is supplied from the power source E1 while the output of the inverter 602 has already become "1" so that the state of the Flip-FLop 703 is inversed in such a manner that the camera starts from the beginning in the same way as in case of the first shutter release. (Namely in FIG. 7 the phase at j coincides with that at b). Hereby the counters A-G memorize the proper aperture value (1 in FIG. 7) while the switch SW5 is changed over to the NC side and then the shutter is released by means of the release magnet after the counter 401-420 has counted the time determined by $\overline{Q8}$, Q9 and $\overline{Q10}$ (after about 10 ms.) or after the time (about 10 sec.) determined by $\overline{Q18}$ and $\overline{Q20}$ in case the self-timeer is set (m in FIG. 10). Therefore, in case of the ordinary photography the shutter is released almost at the same time with the termination of the current supply to the motor, which is convenient at the time of the continuous winding up. The proper aperture value is determined (n in FIG. 10) and then the front shutter plane starts to run so as to start the exposure (o in FIG. 10). After the lapse of the predetermined shutter time, the rear shutter plane starts to run (p in FIG. 10). When the rear shutter plane has run, the switch SW5 is changed over from the NC side to the NO side from the beginning (q in FIG. 10), whereby the motor M starts to rotate so as to start the second winding up (r in FIG. 10). Thus, while the release button is being pushed, the shutter release and the winding up operation are repeated so as to carry out the continuous photography. (The point r and the point i in FIG. 10 show the same state whereby at the point r the winding up is started, while at the point j the winding up is completed.)

When the film has all been consumed, the shutter release is completed whereby the switch SW5 is changed over from the NC side to the NO side so that the film can not be wound up no matter how the motor M rotates so that the switch SW5 remains changed over to the NO side. In this state the electrical potential at the point B of the circuit 302 in the motor driving device in FIG. 5 is low, the current continues to run through the transistor Tr104, the resistance R108, the transistor Tr103 and the resistance R10 so as to keep the motor in the locked state. At this time, the condenser C101 continues to be charged through the resistance, whereby the electrical potential at the point C goes up gradually in such a manner that the transistor Tr102 is brought into the switched on state after lapse of the set time after the switch SW5 has been changed over to the NO side (after the time longer than the winding up time as is explained in accordance with FIG. 3).

Then the voltage between the base and the emitter of the transistor Tr103 goes down until the transistor Tr103 is brought into the switched off state in such a manner that the base current of the transistor Tr104 flows no more so as to bring the transistor Tr104 in the switched off state. After lapse of the time determined by the resistance R109 and the condenser C102 (about several ms.), the relay coil RL1 is switched off, whereby the switch $l_1$ is changed over from the NO side to the NC side so that no current is supplied to the motor so as to release the locked state. On the other hand, when the point B is connected to the negative side of the power source (namely, the switch SW5 is at the NO side), while the transistor Tr101 is in the switched off state (namely the transistor Tr104 is switched off state), a current flows through the illuminating diode LED4, the resistance R101 and the resistance R102 so that the diode LED4 lights up. However, when the transistor Tr101 is in the switched on state even if the point B is connected to the negative side of the power source B1, the potential difference between the point E and the point D is only about 0.1 V, the voltage drop in the transistor Tr3, which is lower than the voltage (higher than 1.4 V) necessary for the illuminating diode LED4 to light up so that the diode LED4 does not light up. Namely, even when the switch SW5 is changed over to the NO side, the transistors Tr104 and Tr101 are brought into the switched on state and the current is supplied to the motor M, the film is not wound up, whereby when after elapse of the time determined by the resistance R103 and the condenser C101 the transistors Tr104 and Tr101 are brought into the switched off state so as to interrupt the current supply to the motor the illuminating diode LED4 lights up, from which the photographer can notice that the film has all been consumed. Also when the voltage of the power source B1 of the motor driving device goes down due to the consumption of the battery and so on, the output power of the motor M goes down and the winding up operation can not be completed within the time determined by the resistance R103 and the condenser C101, the illuminating diode LED4 flickers by means of the same operation, from which the photographer can notice that the voltage of the power source is lowered.

As explained above in the case of the present invention, the delay time (the interval between the point j and the point h in FIG. 7) at the time of the winding up completion produced by the resistance R109 and the condenser C102 in the chattering prevention circuit in FIG. 5 compensates the difference between the change over timing of the switch SW5 and the winding up completion timing of the mechanical parts as has already been explained. Moreover the motor M continues to be rotated during the time corresponding to the delay time even after the winding up completion so as to exercise an overload on the winding up shaft 236 of the camera in FIG. 4, the motor M is rotated along the backward direction by means of the overload as has been explained and thus the overload on the winding up shaft 236 is completely removed by means of this backward rotating power in such a manner that the excessive friction between the notch 230a of the winding up stop cam and the rising up portion 229a at the one end of the winding up stop lever can completely be removed. By doing as mentioned above, the difficulties to be mentioned below are prevented. Namely, when the overload sufficient for rotating the motor M along the backward direction is not exercised on the winding up shaft 236, the proper friction power of the motor M and the gears 247, 254 to 259 remain applied to the winding up shaft 236 so that an excessive friction power remains existing between the notch 230a of the winding up stop cam and the rising up portion 229a of the winding up stop lever, whereby the winding up stop lever 229 can not be released by means of the strength of the spring 231 so that even if the rear shutter plane has run and the shutter release has been completed, the next winding up operation can not be carried out because the switch SW5 is not changed over. Such an inconvenience can be avoided in accordance with the present invention.

Further in the case of the above mentioned embodiment, the holding of the shutter is released by making use of the power of the excited magnet so that even when the current is being supplied after the completion of the winding up by means of the motor the electrical release signal is produced by means of the winding up completion signal so as to form the measured light memory time with the electrical release signal and the binary counter, whereby in case the measured light memory operation is not necessary, the camera shutter can be released without any difficulty directly by means of the winding up completion signal. The measured light memory operation can be completed almost in an instant by means of a photo diode with superior light responce characteristics and the A-D light measuring circuit as in the embodiment so that the shutter is released almost simultaneously no matter whether the measured light memory operation is carried out before or after the completion of the winding up in such a manner that especially the time loss at the time of the continuous winding up can be avoided.

Further in accordance with the present invention, even in case the driving power is amplified by means of the gear group in the same way as in case of the conventional automatic winding up device consisting of a small motor with small driving power, the strength removing effect of the overload can easily be achieved so that without using a sliding clutch and so on a compact automatic winding up device simple in construction can be offered, which is profitable.

Further it goes without saying in the case of the present invention that when the continuous photography is carried out in the state in which the camera is set in the self-timer mode the shutter is released in about 10 sec. (the time set at the self-timer) after the completion of the winding up so that a photograph can be taken every about 10 sec., the self-timer being used as the interval-timer.

Below the case when the flash light photography is carried out, the speed light device being mounted on the camera body will be explained.

When at first the main condenser ST3 has been charged after the power source switch ST11 of the speed light device is closed, the neon tube ST4 and the transistor ST8 are brought into the switched on state so as to increase the current flowing through the terminals P6, P7 and P134 and the resistance R13 and the output of the operational amplifier AR9. Thus the comparison circuits CP4 and CP5 are inversed so as to change the output from "1" into "0", whereby the inverting input terminal of the operational amplifier AR5 is changed over from the input terminal 1 for the normal photographic mode to the input terminal 2 for the flash light photographic mode while the change over circuit 302 is operated. Thus, the flash light photographic information which is the output of the operational amplifier ST10 is supplied to the operational amplifier AR5 through the terminals P10, P9 and P135 and the voltage dividing resistances R20 and R21 so as to control the output of the operational amplifier AR5 and obtain the selected aperture value information. Further the inverted output of the comparison circuit CP5 brings the transistors Trc1, Trc2 and Trc3 normally in the switched on state into the switched off state and at the same time the transistors Trc4 normally in the switched off state into the switched on state, while the condenser C5 so far connected to the resistance VR5 for the normal photographic mode is connected to the resistance R32 for the flash light photographic mode so as to prepare the mode for the flash light photography.

What is claimed is:

1. An automatic winding up device for a camera comprising:
   an electrical power source;
   a winding up motor to be connected to the power source;
   a winding up member to be driven by the winding up motor, said member for winding up a camera;
   first switch means connected between the winding up motor and the power source, said means connecting the winding up motor to the power source at the first position and interrupting the connection of the winding up motor to the power source at the second position;
   a terminal for receiving a winding up completion signal as well as an exposure completion signal from the camera body;
   second switching means for detecting whether the signal received by the terminal is the winding up completion signal or the exposure completion signal;
   delay means commencing operation when the second switch means detects the winding up completion signal so as to count a certain determined time; and
   change over means for controlling the change over of the first switch means from the first position to the second position or from the second position to the first position, said means bringing the first switch means in the first position when the second switch means detects the exposure completion signal and in the second position after the lapse of a certain time determined by the second switch means once the second switch means has dtected the winding up signal;
   whereby the delay means overdrives the motor for a certain determined time after the winding up completion so as to exercise an overload on the winding up of the camera body by means of the winding up member and after the lapse of a certain determined time the motor is stopped, when the winding up member is driven along the reversed direction by means of a back pressure due to the overload on the winding up so as to release the camera body from the load.

2. An automatic winding up device in accordance with claim 1, further including a brake means for braking the motor, said means operable when the switch means is connected to the second position.

3. An automatic winding up device in accordance with claim 2, wherein the braking means including a one way conductive element, said element bringing the motor into the short-circuited state when the motor rotates along the winding up direction and bringing the motor out of the short-circuited state when the motor rotates along the direction opposite to the winding up direction.

4. An automatic winding up device in accordance with claim 3, further including a timer commencing operation by the exposure control device produced by the second switch means, said means actuating the delay means after the lapse of a certain determined time.

5. An automatic winding up device in accordance with claim 3, wherein the one way conductive element being a diode.

6. An automatic winding up device in accordance with claim 4, further including,
a display means to be brought into the display state after elapse of the certain time determined by the timer.

7. An automatic winding up device in accordance with claim 6, wherein the display means being an illuminating diode.

8. An automatic winding up device in accordance with claim 1, wherein the change over control means includes an electromagnetic relay, the first switch means being constructed as a contact of an electromagnetic relay, said electromagnetic relay connecting the first switch means to the first position when the relay is in the excited state and connecting the first switch means to the second position when the relay is in the non-excited state.

9. An automatic winding up device in accordance with claim 8, wherein the delay circuit being a time constant circuit consisting of a resistance and condenser, said time constant circuit being connected parallel to the electro-magnetic relay so as to bring the relay in the non-excited state after the condenser has been discharged.

10. A camera having a motor driving device comprising:
film wind up means;
exposure control means;
first detecting means for detecting completion of a winding up action of said film winding means and completion of an exposure action by said exposure control means, said first detecting means generating a winding completion signal upon detection of completion of the winding action and an exposure action completion signal upon detection of completion of the exposure action;
second detecting means for detecting completion of the winding up action of said film winding means and completion of the exposure action of said exposure control means, said second detecting means generating a winding completion signal upon detection of completion of the winding action and an exposure action completion signal upon detection of completion of the exposure action;
operating means;
signal generating means being arranged to generate a releasing signal in response to an operation of said operating means;
actuating means for actuating said exposure control means, said actuating means being arranged to be made inoperative by the exposure action completion signal generated by said first detecting means and to be made operative by the winding completion signal of the first detecting means and also by the releasing signal of said signal generating means;
driving means for driving said film winding means;
switching means for controlling the driving action of said driving means, said switching means being arranged to bring said driving means into a driving state when said switching means is in its first position and to bring said driving means into a non-driving state when in its second position;
delay means which commences a counting action in response to the winding completion signal from said second detecting means and produces a signal after completion of counting for a predetermined length of time;
change over control means for shifting said switching means between the first and second positions thereof, said change over control means being arranged to shift the switching means to the first position upon receipt of the exposure action completion signal from said second detecting means and to the second position upon receipt of a signal from said delay means; and
a timer disposed between said switching means and actuating means, said timer being arranged to act as self timer for a non-continuous photographing operation and as interval timer for a continuous photographing operation.

11. A camera having a motor driving device in accordance with claim 10, further including a brake means for braking the driving means, said means being operable when the switching means is connected to the second position.

12. A camera having a motor driving device in accordance with claim 11, wherein the driving means is a motor, the brake means includes a one-way conductive element, said element bringing the driving means in the short-circuited state when the driving means rotates in the winding up rotation and out of the short-circuited state when the driving means rotates in the direction opposite to the winding up direction.

13. A camera having a motor driving device in accordance with claim 12, further comprising a timer starting to operate when the detecting means detects the exposure completion signal, said timer actuating the change over control means after a certain determined time so as to connect the switch means to the second position.

14. A camera which can have an electrical driving device mounted thereon, comprising:
an exposure control means;
a means to detect completion of exposure which detects the completion of exposure action by said exposure control means, said detection means generating an exposure completion signal as it detects the completion of exposure action;
an actuating means to actuate said exposure control means;
a switch means to activate said actuating means;
an operating means to place said switch means in ON or OFF state, said operating means being placed in ON state by manual pressing and is placed in OFF state by releasing the manual pressing;
a timer inserted between said switch means and said actuating means, said timer activating said actuating means after lapse of a predetermined period of time since a release ready state;
a wind up means having a wind up coupler;
wind up completion detection means to detect release ready state, said means generating a release ready signal when said wind up means completes wind up action and a releasable state is secured;
a circuit means to add a release ready signal to the timer when said switch means is in ON state; and
a terminal to transmit said exposure completion signal;
whereby, when the electrical driving device is mounted, said device is connected to said terminal and said wind up coupler and when said switch means is pressed by the operating means in a release ready state, said timer functions as a self timer, while when the switch means is maintained pressed by the operating means and a release ready signal is generated, said timer conducts a delay action during a period of time starting with the release ready state and ending at a moment when the actuating means begins action.

* * * * *